United States Patent [19]

Poston et al.

[11] 4,245,718

[45] Jan. 20, 1981

[54] COLLAPSIBLE WORK SUPPORT

[75] Inventors: Daniel W. Poston, North Webster; James R. Hestad, Osceola, both of Ind.

[73] Assignee: Miller Manufacturing Corp., Nappanee, Ind.

[21] Appl. No.: 71,755

[22] Filed: Aug. 31, 1979

[51] Int. Cl.[3] .............................................. F16M 11/00

[52] U.S. Cl. .................................... 182/153; 182/181; 182/225

[58] Field of Search ................ 182/153, 186, 181-185, 182/224, 225, 226

[56] References Cited

U.S. PATENT DOCUMENTS

| | | | |
|---|---|---|---|
| 2,825,606 | 3/1958 | Rebensdorf | 182/153 |
| 3,406,786 | 10/1968 | Lang | 182/186 |
| 3,481,430 | 12/1969 | Solomon | 182/153 |
| 3,734,235 | 5/1973 | Lanier | 182/153 |
| 4,113,056 | 9/1978 | DeLorenzo | 182/153 |

*Primary Examiner*—Reinaldo P. Machado

*Attorney, Agent, or Firm*—Oltsch, Knoblock & Hall

[57] ABSTRACT

A work support or saw horse formed of lightweight tubular metal and having a hinge which facilitates folding of the support to a reduced size for storage and transportation. One embodiment of the support has integral portions which interlock to form an integral hinge which extends the entire length of the support.

1 Claim, 4 Drawing Figures

COLLAPSIBLE WORK SUPPORT

SUMMARY OF THE INVENTION

This invention relates to a work support of the type commonly known as a saw horse.

In the support of this invention, a saw horse is formed of lightweight tubular metal. The horizontal work-supporting member or cross member of the saw horse includes first and second elongated parts which are shaped to interlock and to allow limited pivotal movement with respect to one another. The first and second parts cooperate to define an elongated hinge having a pivot axis parallel to the longitudinal axis of the horizontal member and of the saw horse. The four legs of the saw horse are secured to the horizontal parts, the two legs attached to each part being equally spaced apart. The legs are preferably secured by welding and are preferably formed of the same metal as said first and second parts. The legs are elongated and extend substantially perpendicularly from each part of the cross member. The two legs secured to each part of a cross member are preferably substantially parallel to each other. The first and second parts of the cross member may be interlocked with each other by engaging the correlated hinge portions of the parts and then relatively sliding the parts longitudinally to interlocking relation throughout their entire length. In full interlock position, the legs of opposite parts are located opposite each other. The legs are so positioned in their respective parts that when the parts of the support are pivoted to a first or use position, the legs extend downwardly and outwardly and form an inverted "V" shape. A hinged retainer or folding brace connects adjacent opposing legs, being pivotally connected at its ends to opposite legs intermediate their length. The folding brace prevents disengagement of the two parts, as by sliding longitudinally apart. The support may be collapsed by folding the braces or retainers and pivoting the first and second parts and connected legs to a second or collapsed position in which the opposed legs are substantially parallel.

Another embodiment of the support employs conventional hinges to interconnect and pivot the two parts.

It is an object of this invention to provide a novel work support which is readily collapsible for convenient storage in a small space.

Another object is to provide a collapsible work support in which a first part and a second part are shaped and correlated to pivotally engage each other.

Another object is to provide a collapsible work support in which the pivotal engagement of correlated parts defines an elongated continuous hinge integral with the parts.

Another object is to provide a collapsible work support which is strong and dependable.

Another object is to provide a collapsible work support which is light and which is compact when in its collapsed position.

Another object is to provide a collapsible work support which is formed of tubular metal.

Another object is to provide a collapsible work support which is economical to manufacture and efficient in use.

Other objects will be apparent from the following specification.

DESCRIPTION OF THE PREFERRED EMBODIMENTS

The preferred embodiments illustrated are not intended to be exhaustive nor to limit the invention to the precise forms disclosed. They are chosen and described to explain the principles, application, and practical use of the invention and to thereby enable others skilled in the art to utilize the invention.

Figure 1A:
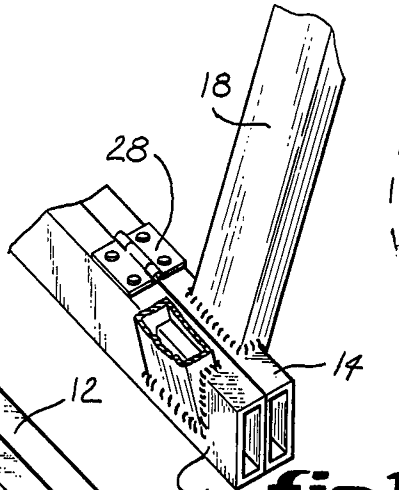
FIG. 1A is a fragmentary bottom perspective view of another embodiment of the support with parts broken away for purposes of illustration.
Figure 2:
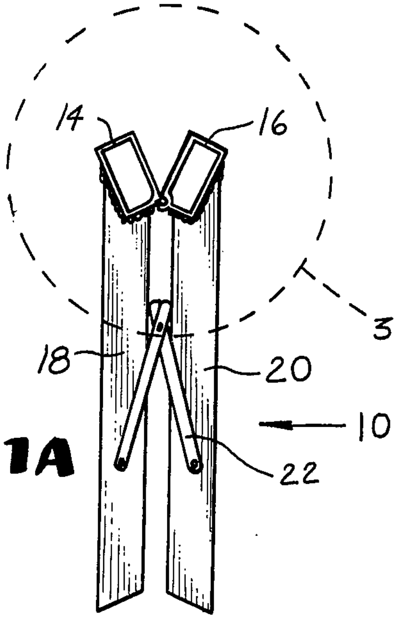
FIG. 2 is an end elevation view of the collapsible work support in a collapsed position for storage.
Figure 1:
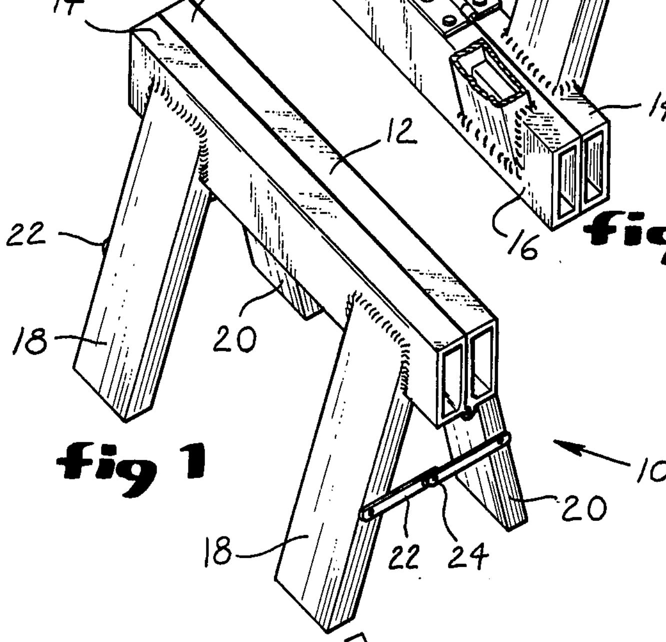
FIG. 1 is a perspective view of the collapsible work support in position for use.
Figure 3:
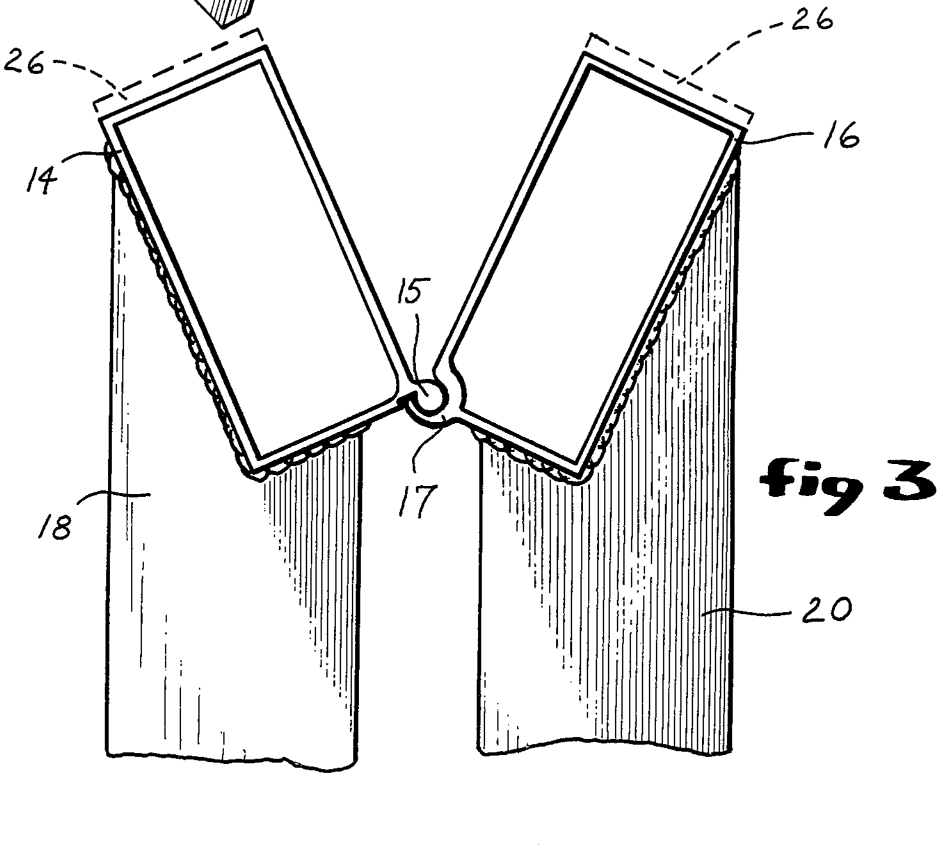
FIG. 3 is an enlargement of the view within circle 3 of FIG. 2.

With reference to FIGS. 1–3 of the drawings, the number 10 designates a collapsible work support having a horizontal work-supporting or cross member 12, preferably formed of rectangular aluminum tubing. Member 12 includes a first part 14 and a second part 16 which constitute extruded tubes having integral longitudinal complementary parts, such as a projecting longitudinal part cylindrical member 15 on part 14 and a longitudinal projecting socket member 17 of arcuate shape on part 16 respectively of such size and shape and so positioned as to interlock and to allow limited pivotal movement of parts 14 and 16 relative to each other, as best illustrated in FIG. 3. The complementary parts 15 and 17 accommodate assembly of the work support by sliding one part longitudinally with respect to the other to interfit and interlock the parts 15 and 17 throughout their length to form a hinge connection between the complementary cross members 14 and 16.

Member 14 has two spaced parallel legs 18 secured thereto, as by welding. Member 16 likewise has two spaced parallel legs 20 secured thereto. The legs 18 and 20 preferably extend perpendicularly from the respective members 14 and 16 to which they are secured in such relation as to diverge from members 14 and 16 when the latter are positioned in face abutting relation as seen in FIG. 1, and are substantially equally spaced and are similarly spaced from the ends of members 14 and 16. A hinged or folding brace 22 connects the adjacent pair of legs 18, 20 at each end of the support, being pivotally connected to said legs. Brace 22 is hinged at 24 at a point equally spaced from the pivots at its opposite end. Brace 22, by its connection to the legs 18 and 20, serves to prevent members 14 and 16 from sliding longitudinally relative to each other.

Support 10 may be collapsed to a compact position, as viewed in FIGS. 2 and 3, by folding or pivoting the braces 22 at 24 and swinging the opposed pairs of legs 18 and 20 toward each other about their hinging portions 15 and 17 to a position occupying minimum space for storage.

As shown by the phantom lines in FIG. 3, members 14 and 16 may carry strips of wood, plastic, or other facing material 26 upon their upper faces. Strips 26 may be attached to the members 14 and 16 by screws or other securing means (not shown), or they may be attached by other means, for example by gluing.

Another embodiment of the support is shown in FIG. 1A, which illustrates the support in an inverted position.

In this embodiment, hinges 28 are secured to and connect the members 14 and 16. In this embodiment, the parts 14 and 16 are not shaped to interlock with each other but the support is similar to that first described in other respects.

The use of this invention involves its extension and placement in the position shown in FIG. 1 in which it can support a load or item to be worked upon. For example, a carpenter may use two or more supports to hold boards which are to be sawed. In this position, the extended braces 22 span the legs of the support and cooperate with face abutment of members 14 and 16 to prevent further leg separation under load. The elongated hinge 15, 17 formed integrally with the members 14 and 16 provides a strong connection between the pivoted parts.

The support may be collapsed to a reduced size by folding the braces 22 and pivoting the opposed legs 18 and 20 toward each other to a position in which they are substantially parallel, as viewed in FIG. 2. When in its collapsed position, the support is readily transported and requires little space for storage. A further advantage is provided by the light weight of the support which facilitates storage, transportation, and handling of the support. The weight of the finished support is less than that of a wooden saw horse of equivalent size, yet is as strong and rigid as a wooden saw horse which lacks the property of collapsibility. This support is durable and also offers a long service life when formed of aluminum tubing.

It is to be understood that this invention is not to be limited to the precise form described but that it may be modified within the scope of the appended claims.

What I claim is:

1. A collapsible work support comprising a first part having an elongated cross member and two spaced substantially parallel legs extending angularly from said cross member, a second part having an elongated cross member and two spaced substantially parallel legs extending angularly from said last named cross member, said cross members being formed of metal tubing of rectangular cross sectional shape and said legs of each part extending at an angle to and secured to two surfaces of said rectangular cross member, the cross member of the first part including an elongated integral extruded part-cylindrical joint-forming member projecting from a corner thereof the cross member of the second part including an elongated integral extruded socket-forming member projecting from a corner thereof, said projecting cylindrical and socket members interfitting at the lower inner corners of said cross members when assembled to accommodate limited pivotal movement of said first and second parts between a position in which adjacent faces of said tubes abut and the legs of said first and second parts diverge downwardly and a position in which the legs of opposite parts are substantially parallel, and a folding brace connected to legs of said first and second parts intermediate their length to limit relative longitudinal movement of said first and second parts, and accommodate pivotal movement thereof.

* * * * *